United States Patent Office 3,130,920
Patented Apr. 28, 1964

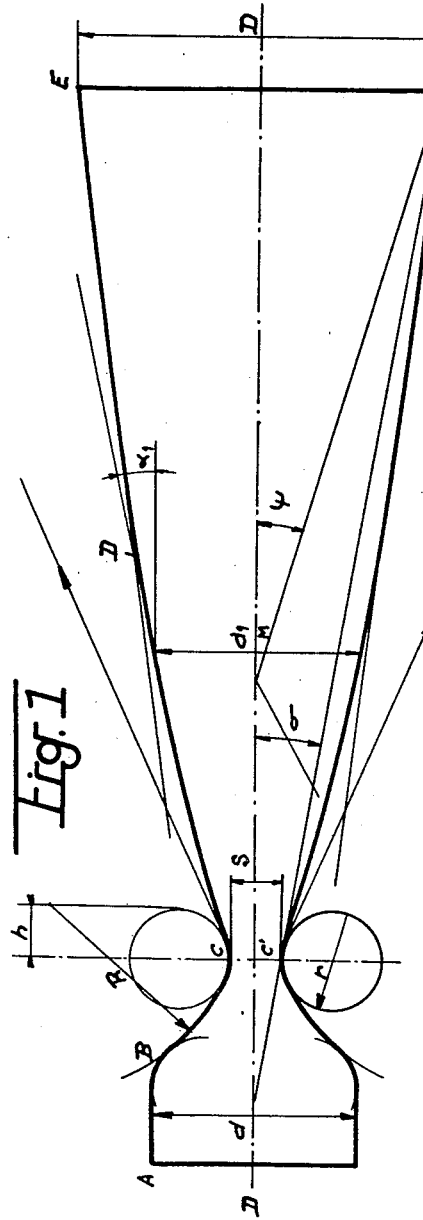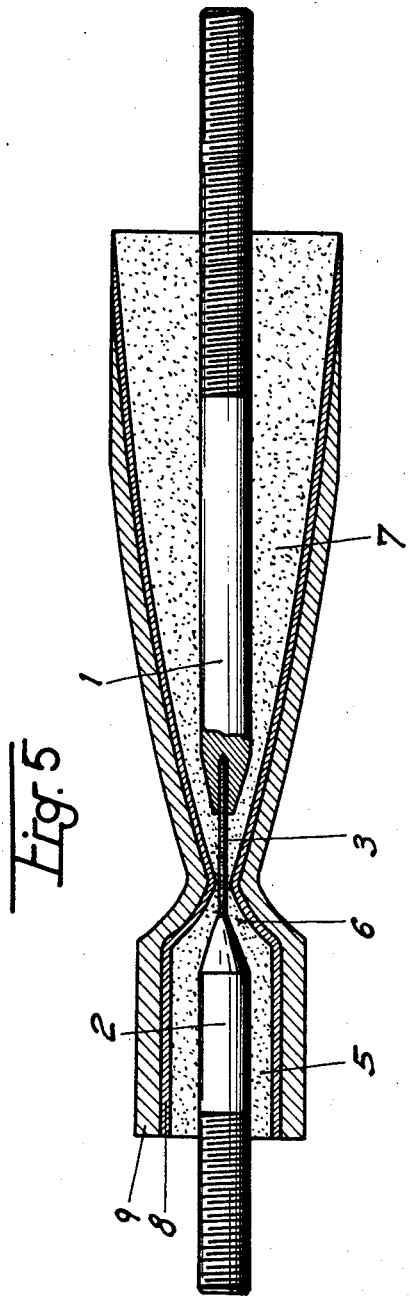

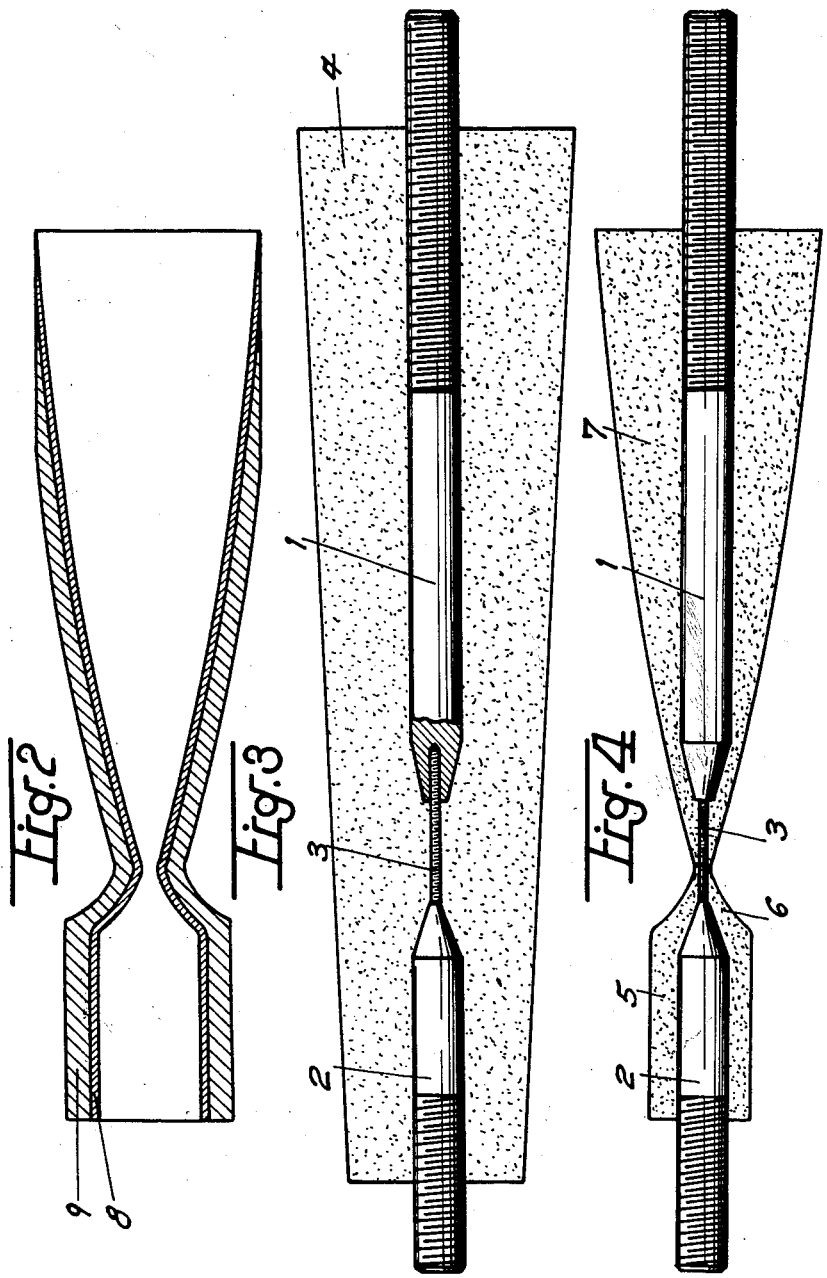

3,130,920
NOZZLE HAVING A CONVERGING INLET ZONE
FOLLOWED BY A DIVERGING OUTLET ZONE
Georges Devillard, Bourg-la-Reine, France, assignor to Codeco, Vaduz, Liechtenstein, a company of Liechtenstein
Filed Mar. 26, 1962, Ser. No. 182,392
Claims priority, application France Mar. 28, 1961
5 Claims. (Cl. 239—601)

The present invention has for its object an improved device and a method of manufacture of the said device, the term "nozzle" comprising not only nozzles proper, but any hollow device of similar shape which must have certain characteristics of internal shape or of surface such as those which will be specifically described below.

The invention has more especially for its object any hollow device so designed that the internal surface thereof is a surface of revolution, that the said internal surface has a shape such that the machining or inspection and checking of this latter is impossible by means of known methods, and (or) that the said internal surface must have a mirror polish even though being inaccessible to polishing tools.

The invention relates especially, although not exclusively, and by way of new industrial product, to an improved nozzle having a diverging tube characterized in that the said diverging tube is generated by the rotation of the arc of a curve about the longitudinal axis of the nozzle, the said arc of a curve being determinable by points.

It is in its application to a nozzle of this kind that the invention will be more particularly described, this particular type of nozzle being understood to form part of the present invention but does not constitute a limitation thereof.

In a nozzle of this type, it is important to ensure that the stream lines of the fluid which passes through the nozzle do not break away from the surface of this latter, that is to say that at each point of the said surface, the slope of its profile must be less than $$\operatorname{tg} \varphi = \frac{u}{v}$$

tg $\varphi$ meaning the tangent of the angle $\varphi$, $u$ being the mean quadratic velocity of agitation of the molecules and $v$ the axial velocity of flow in adiabatic expansion in the section considered.

(1) *Conception of the coefficient of slip, and value of this conception.*—It is possible to determine the profile which corresponds to the best efficiency of the nozzle by applying the principle of the coefficient of slip.

The coefficient of slip is defined by the relation $$d = \frac{\operatorname{tg} \alpha}{\operatorname{tg} \varphi}$$

tg $\varphi$ having the meaning previously given and tg $\alpha$ is the tangent of the angle $\alpha$ defined further hereinbelow.

With $u$ in meters/second (mean quadratic velocity of agitation of steam molecules: $u = \sqrt{RTa}$),
R being the constant of ideal gas:

$$\frac{29.27}{427} \frac{\text{kcal.}}{\text{kg.} \, ^\circ \text{C.}}$$

in the case of steam,
$Ta$ being the static temperature in the flow section considered.
With $v$ in meters/second: axial velocity of flow of the steam or vapour in adiabatic expansion in the flow section considered:

$$v = \sqrt{2g\Delta H}$$

$g$ being the acceleration of gravity,
$\Delta H$ being the enthalpy drop $$\frac{\text{kcal.}}{\text{kg.}}$$

during the expansion.

The angle $\varphi$ represents the maximum slope of the profile at the point considered in order to prevent any break-away of the fluid stream lines. The coefficient of slip $d$ provides the means of calculating the angle $\alpha$ of true slope of the profile which corresponds to the maximum efficiency of the nozzle. The most favorable values of the coefficient of slip have been defined experimentally and the value recommended is $d = \frac{1}{3}$ which is constant along the entire length of the profile.

This conception of the coefficient of slip is general in scope and applies to a fluid of any kind in a state of supersonic expansion. Depending on the nature of the fluid, the only change occurs in the coefficient R (constant of the fluid) in the formula $u = \sqrt{RTa}$.

(2) *Generalization of the profile envelope curve irrespective of the conditions on the upstream or downstream side of the nozzle.*—The hypothesis of definition of the profile in respect of a given pressure at the inlet and at the outlet of the nozzle is based on the kinetic theory of gases and makes use of a concrete physical observation.

In order to prevent any break-away of the stream lines of vapour, it is necessary to ensure that, at every point of the profile, the angle of slope is less than the tangent $$\frac{u}{v}$$

In fact, it is advisable that the fluid applies pressure at every point against the nozzle wall. This pressure is in direct relation to the mean quadratic velocity of agitation of the fluid molecules which strike against the wall. The absolute movement of each molecule must be such that the path thereof results in local slopes which are at least equal to the slope of the profile at the point considered.

We have previously stated that $$\operatorname{tg} \varphi = \frac{u}{v}$$

$$v = \sqrt{2g\Delta H}$$

$$u = \sqrt{RTa}$$

hence $$\operatorname{tg} \varphi = \frac{u}{v} = \left[\frac{3}{2} \frac{R}{C_P}\right]^{1/2} \sqrt{\frac{1}{\frac{To}{Ta} - 1}}$$

$To$ being the upstream generating temperature,
R being the gas constant,
$C_P$ being the specific heat at constant pressure, and
$Ta$ having the meaning previously given.

In respect of pre-established upstream and downstream pressures, the laws of flow determine for each flow section of the nozzle the diameter D and the limit angle $\varphi$ which must not be exceeded. We have thus defined a limit curve as a function of these conditions and inside which is located the curve of maximum efficiency which is obtained by employing the true angle $\alpha$ which is derived from the slip coefficient.

This limit curve is different in the case of other upstream and downstream pressures. The method of definition of the limit profile is therefore general, and in the case of a constant rate of delivery of the nozzle, a series of limit profiles is obtained if the ratio of upstream pressure to downstream pressure is modified.

It is therefore possible by means of these formulae to calculate, in each flow section considered, the local slope of profile and the useful rate of flow (Sv), S being the surface and v having the meaning previously given. The arc of a curve which must generate the internal surface of the nozzle can therefore be plotted by points, the curve thus obtained constituting the envelope of the tangents to the profile.

The nozzle in accordance with the invention thus comprises a converging zone whose generator line is the arc of a circle, a neck, a diverging tube whose generator line is determined in the manner which has been indicated above, and an outlet zone which can be substantially conical.

In practice, the calculation of a nozzle in accordance with the present invention is made by flow sections, bottom and top limits being fixed for the expansion ratios. The circular cross-sectional area of each flow section is given by the calculation of the flow velocity in the flow section considered and of the useful rate of flow.

The present invention also has for its object a method by means of which a nozzle of the type indicated above can be produced without machining, with strict accuracy of profile and an internal surface having a perfect polish, while at the same time producing such a nozzle if necessary in hard metals which are capable of withstanding heat, oxidation and other external actions of this kind.

The method in accordance with the invention consists in forming a male counterpart of the nozzle in a substance which is electrically conductive at least at the surface thereof and which can be eliminated at low temperature, in machining the said counterpart with great accuracy both of profile and of dimensions and in endowing the said counterpart with the condition of surface which it is desired to impart to the internal surface of the nozzle, in subsequently making use of the said counterpart as the cathode of an electrolytic bath for the purpose of depositing thereon a coating of metal having the requisite qualities of hardness and resistance to outside agents, then in eliminating the said counterpart so as to free the final female part.

In particular, when it is required to deposit on the male counterpart particularly hard metals such as nickel or chromium, the formation of a coating of adequate thickness can entail a length of treatment which is incompatible with normal industrial production.

In accordance with a particularly advantageous form of execution of the invention, there is formed on the male counterpart a first electrolytic deposit of a hard and strong metal on which there is superposed a deposit of either an identical or different metal and applied with a spray-gun, the second metal being preferably chosen so as to have a coefficient of expansion which is proximate to that of the metal which has been deposited electrolytically.

Further characteristic features of the invention will be brought out by the description which follows below, reference being made to the accompanying drawings which are given solely by way of example and not by way of limitation, and in which:

FIG. 1 shows diagrammatically the formation of the internal profile of a nozzle in accordance with the invention;

FIG. 2 is a longitudinal cross-section of a nozzle manufactured by means of the method which forms the subject of the present invention;

FIG. 3 illustrates the core from which the male counterpart of the said nozzle is destined to be formed;

FIG. 4 illustrates the said male counterpart after machining;

FIG. 5 illustrates the nozzle after the execution of the method has been completed and prior to the elimination of the said male counterpart.

FIG. 1 illustrates the curve which, by rotation about the axis DD, generates the internal surface of the nozzle. The portion AB of this curve does not have an imperative shape; it is only necessary to ensure that the said portion has no points of inflexion prior to the point at which it joins the portion BC. This latter portion BC is constituted by an arc of a circle having a radius R which is equal to approximately eight times the diameter $\delta$ of the neck, the centre of the said circle being on a line which is perpendicular to the axis DD and which is located at a distance of approximately 2.3 $\delta$ from a line perpendicular to the same axis and passing through C, on the downstream side of this last-mentioned perpendicular line.

The neck itself is located at C and the curve accordingly has the shape of an arc of a circle which joins the circle BC; this arc has its centre on the perpendicular line which passes down from c on the axis DD and the radius r of the said arc is approximately 1.5 $\delta$.

The portion CD of the diverging tube is an arc of a curve which is determined by points as indicated above and which is joined on the one hand to the circle having a radius r and, on the other hand, to the straight portion DE.

FIG. 2 illustrates the nozzle whose internal profile corresponds to the curve which is defined in FIG. 1.

The need to have a perfectly polished internal surface makes it impossible to produce this nozzle by making use of the usual known means.

In accordance with the invention, the operation consists in first producing a rough cast by chill-moulding, the said rough cast comprising a reinforcement constituted by two strengthening rods 1 and 2 which are joined together by a threaded rod 3, as shown in FIG. 3. There is poured round the said reinforcement a metal alloy 4 having the requisite properties for machining purposes, the said alloy melting at low temperature and being capable of taking a perfect polish. A silver regulus will be employed, for example, having substantially the following composition:

| | |
|---|---|
| Tin | 87.08 |
| Antimony | 6.48 |
| Lead | 0.25 |
| Nickel | 8.32 |
| Copper | 3.30 |
| Silver | 2.55 |

This regulus melts at 270° C.; it can be machined and polished perfectly.

It would also be possible to make use of a plastic material which is soluble in a given solvent and which would be made electrically conductive by means of a surface treatment already known per se.

This rough cast is mounted between centres on a profile-turning or copying lathe and is machined in such manner that the external shape thereof reproduces, as shown in FIG. 4, the exact internal shape of the nozzle to be produced.

There is thus formed a zone 5 corresponding to the inlet of the nozzle, a converging zone 6 and the diverging zone 7; this male counterpart is then polished so as to provide a mirror finish.

In accordance with the present invention, the said male counterpart is employed as a cathode in an electrolytic bath in such manner as to deposit on the said part a coating 8 of the metal chosen (as shown in FIGS. 2 and 5), for example nickel. The surface of the composite part thus produced being then cleaned, the practical operation of the method is completed by applying a coating 9 of metal, for example Monel metal, this latter being deposited by spraying with a spraygun.

It is then merely necessary to heat the whole unit thus obtained in order to be able to eliminate the male counterpart by melting and removing the stiffening rods 1 and 2 by unscrewing them and thus separating them from each other. The nozzle which is thus produced can thus be cleaned internally by washing with acid and with distilled water.

If the counterpart is made of soluble material, for example a substance which is soluble in a solvent or weak acid, the said substance shall accordingly be dissolved in such a solvent or acid.

It is understood, as in any case it follows from the foregoing, that this method is not limited to the manufacture of nozzles, but applies on the contrary to any object which provides similar difficulties of machining.

The method of execution of the invention which has just been described is naturally only a non-limitative example which can be made subject to any detail modification without thereby departing from the scope or the spirit of the invention.

What I claim is:

1. A nozzle for supplying fluids having a longitudinally extending opening comprising a converging inlet zone followed by a diverging outlet zone, said diverging zone being circular in cross section and of progressively increasing diameter and being defined by an elongated surface which is symmetrical about the axis of said diverging zone and which is curved in a longitudinal direction, said surface being generated by the rotation of a curve about the longitudinal axis of said opening, the curve being such that at each point therealong the angle of slope of the curve with respect to said longitudinal axis is smaller than an angle $\varphi$ defined by the formula $$\text{tangent } \varphi = \frac{u}{v}$$

$u$ being the mean quadratic velocity of agitation of the molecules of the fluid being handled and $v$ being the axial velocity of flow of the fluid in adiabatic expansion at the point being considered.

2. A nozzle as claimed in claim 1, in which the angle of slope of the curve is defined by the formula $$\frac{\text{tangent } \alpha}{\text{tangent } \varphi} = d$$

$d$ being a positive number less than 1 and the angle $\alpha$ being the angle of slope.

3. A nozzle as claimed in claim 1, in which the angle of slope of the curve is at least as large as the angle $\alpha$ which is defined by the formula $$\frac{\text{tangent } \alpha}{\text{tangent } \varphi} = \frac{1}{3}$$

4. A nozzle as claimed in claim 1, in which said converging zone is circular in cross section, symmetrical about said longitudinal axis and is curved in a longitudinal direction, said converging zone being generated by the rotation of a curve in the form of an arc of a circle about the longitudinal axis of said opening, a neck between said converging and diverging zones and a substantially conical outlet zone extending longitudinally from the wide end of said diverging zone.

5. An elongated nozzle for supplying fluids, said nozzle being of circular cross section and comprising a converging inlet zone, a neck and a diverging outlet zone each of which is circular in cross section and symmetrical about the longitudinal axis of the nozzle, said converging zone being defined by a longitudinally extending surface which is in the shape of an arc of a circle of a radius approximately eight times the diameter of the neck, the center of said circle being on a line perpendicular to said longitudinal axis and offset in an axial direction downstream from the axial midpoint of the neck a distance of approximately 2.3 times the diameter of the neck, the neck being defined by a longitudinally extending surface in the shape of an arc of a circle of a radius approximately 1.5 times the diameter of the neck and the center of which is on a line perpendicular to said longitudinal axis at the axial midpoint of said neck, the diverging zone being defined by a longitudinally extending surface in the shape of a curve, the curve being such that at each point therealong the angle of slope of the curve with respect to said longitudinal axis is smaller than an angle $\varphi$ defined by the formula $$\text{tangent } \varphi = \frac{u}{v}$$

$u$ being the mean quadratic velocity of agitation of the molecules of the fluid being handled and $v$ being the axial velocity of flow of the fluid in adiabatic expansion at the point being considered.

References Cited in the file of this patent

UNITED STATES PATENTS

| | | |
|---|---|---|
| 2,044,697 | Huss | June 16, 1936 |
| 2,116,863 | Dinley | May 10, 1938 |
| 2,392,408 | Radonich | Jan. 8, 1946 |
| 2,406,838 | Kepler | Sept. 3, 1946 |
| 2,583,726 | Chalom | Jan. 29, 1952 |
| 2,690,901 | McCormack | Oct. 5, 1954 |
| 2,801,133 | Ridley | July 30, 1957 |
| 2,804,339 | Barbour et al. | Aug. 27, 1957 |
| 2,932,884 | Lyon | Apr. 14, 1960 |

FOREIGN PATENTS

| | | |
|---|---|---|
| 522,059 | Belgium | Feb. 11, 1954 |